(12) United States Patent
Larsen et al.

(10) Patent No.: US 8,576,840 B2
(45) Date of Patent: Nov. 5, 2013

(54) ASSIGNING PACKETS TO A NETWORK SERVICE

(75) Inventors: Loren Douglas Larsen, Spokane Valley, WA (US); Andrew P. Schultz, Spokane, WA (US)

(73) Assignee: World Wide Packets, Inc., Spokane, WA (US)

( * ) Notice: Subject to any disclaimer, the term of this patent is extended or adjusted under 35 U.S.C. 154(b) by 1254 days.

(21) Appl. No.: 11/559,313

(22) Filed: Nov. 13, 2006

(65) Prior Publication Data

US 2008/0112403 A1 May 15, 2008

(51) Int. Cl.
*H04L 12/28* (2006.01)

(52) U.S. Cl.
USPC ............ 370/389; 370/392; 370/401; 370/402

(58) Field of Classification Search
USPC .................................. 370/395.53, 400, 409
See application file for complete search history.

(56) References Cited

U.S. PATENT DOCUMENTS

| | | | | |
|---|---|---|---|---|
| 5,991,300 | A * | 11/1999 | Tappan | 370/392 |
| 7,154,889 | B1 * | 12/2006 | Rekhter et al. | 370/392 |
| 7,260,648 | B2 * | 8/2007 | Tingley et al. | 709/245 |
| 2003/0095554 | A1 * | 5/2003 | Shimizu | 370/395.53 |
| 2003/0174706 | A1 * | 9/2003 | Shankar et al. | 370/393 |
| 2004/0017816 | A1 * | 1/2004 | Ishwar et al. | 370/395.53 |
| 2004/0081180 | A1 * | 4/2004 | De Silva et al. | 370/402 |
| 2005/0013306 | A1 * | 1/2005 | Albrecht | 370/395.53 |
| 2005/0071672 | A1 * | 3/2005 | Fung | 713/201 |
| 2005/0083936 | A1 * | 4/2005 | Ma | 370/392 |
| 2005/0163102 | A1 * | 7/2005 | Higashitaniguchi et al. | 370/351 |
| 2005/0213582 | A1 * | 9/2005 | Wakumoto et al. | 370/395.3 |
| 2006/0002394 | A1 * | 1/2006 | Kuranari et al. | 370/392 |
| 2006/0080421 | A1 * | 4/2006 | Hu | 709/223 |
| 2006/0227777 | A1 * | 10/2006 | Shimizu | 370/389 |
| 2006/0245438 | A1 * | 11/2006 | Sajassi et al. | 370/399 |
| 2006/0251065 | A1 * | 11/2006 | Hamamoto et al. | 370/389 |
| 2007/0064628 | A1 * | 3/2007 | Tallet et al. | 370/256 |
| 2008/0031266 | A1 * | 2/2008 | Tallet et al. | 370/401 |
| 2008/0198857 | A1 * | 8/2008 | Kim et al. | 370/401 |

* cited by examiner

*Primary Examiner* — Brandon Renner
(74) *Attorney, Agent, or Firm* — Clements Bernard PLLC; Christopher L. Bernard; Lawrence A. Baratta, Jr.

(57) ABSTRACT

This document describes tools that assign packets to a network service. The tools receive a control packet lacking a tag associating the control packet with a network service and assign the control packet to a network service by adding a tag to the control packet. The tools may also receive a tagged data packet on a port and determine that the tag does not match any of a set of network tags associated with the port. Consequently, the tools assign the data packet to a default network service. The tools may also receive a set of conditions for a port and assign data packets received on the port that satisfy one of the conditions to a network service associated with the satisfied condition and data packets that do not satisfy one of the conditions to a default network service.

15 Claims, 9 Drawing Sheets

ASSIGNING PACKETS TO A NETWORK SERVICE

BACKGROUND

Service providers commonly offer network services that enable packet communication between a plurality of geographically dispersed sites associated with a subscriber. Such services may be referred to as Virtual Private Network services (VPNs). A VPN enables sites associated with the VPN to communicate with each other as if the sites were part of a single local area network.

In offering network services, service providers may use a single network infrastructure to provide the network services for more than one subscriber. In doing so, the network infrastructure segregates packets belonging to one subscriber from packets belonging to other subscribers so that one subscriber is not able to access a VPN associated with another subscriber.

Subscriber devices that are part of a VPN may send control packets to the VPN requesting that the network device that receives the control packet make a behavior or configuration change. Conventional service provider networks handle these control packets by acting on the request made by the control packet. Consequently, a subscriber device may effect a change in the service provider network without the knowledge or consent of the service provider and may thereby affect a VPN associated with another subscriber.

In addition to control packets, subscriber devices may send tagged data packets to the VPN. Conventional service provider networks may be configured to accept data packets having one of a set of tags and to drop tagged data packets having tags that are not in the set. Such networks require burdensome coordination of tags between subscribers and the service provider to prevent the network from dropping packets sent by the subscriber.

SUMMARY

This document describes tools that assign packets to a network service. The tools receive a control packet lacking a tag associating the control packet with a network service and assign the control packet to a network service by adding a tag to the control packet. The tools may also receive a tagged data packet on a port and determine that the tag does not match any of a set of network tags associated with the port. Consequently, the tools assign the data packet to a default network service. The tools may also receive a set of conditions for a port and assign data packets received on the port that satisfy one of the conditions to a network service associated with the satisfied condition and data packets that do not satisfy one of the conditions to a default network service.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The same numbers are used throughout the disclosure and figures to reference like components and features.

DETAILED DESCRIPTION

Overview

The following document describes tools capable of assigning a packet to a network service. An environment in which the tools may enable these and other actions is set forth below in a section entitled Exemplary Operating Environment. This is followed by another section describing exemplary ways in which the tools may act to assign an untagged control packet to a network service and assign a tagged data packet to a default network service. This second section is entitled Exemplary Embodiments for Assigning a Packet to a Network Service. A final section describes these and other embodiments and manners in which the tools may act and is entitled Other Embodiments of the Tools. This overview, including these section titles and summaries, is provided for the reader's convenience and is not intended to limit the scope of the claims or the entitled sections.

Exemplary Operating Environment

Before describing the tools in detail, the following discussion of an exemplary operating environment is provided to assist the reader in understanding some ways in which various inventive aspects of the tools may be employed. The environment described below constitutes an example and is not intended to limit application of the tools to any one particular operating environment. Other environments may be used without departing from the spirit and scope of the claimed subject matter.

A common service provider business model involves deploying a network infrastructure capable of connecting networks not owned by the service provider such as enterprise networks operated by business enterprises, and the Internet. The service provider's network infrastructure forms a shared access network that the service provider may use to provide network services to a variety of subscribers. Subscribers may find this business model attractive since it is generally more cost effective for a subscriber to use the shared access network than to build a private access network.

Service providers may offer a variety of network services on their access networks such as Virtual Private LAN Services that provide connectivity between multiple locations associated with a single subscriber. Service providers may also offer other network services such as connectivity between a subscriber and the Internet or connectivity between a subscriber and a Voice over Internet Protocol (VoIP) provider.

Each network service provides connectivity between two or more devices that are connected to the access network and associated with the network service. In addition, the network service prevents connectivity via a particular network service between devices not associated with the network service and devices associated with the network service. A device may be associated with more than one network service.

Figure 1:
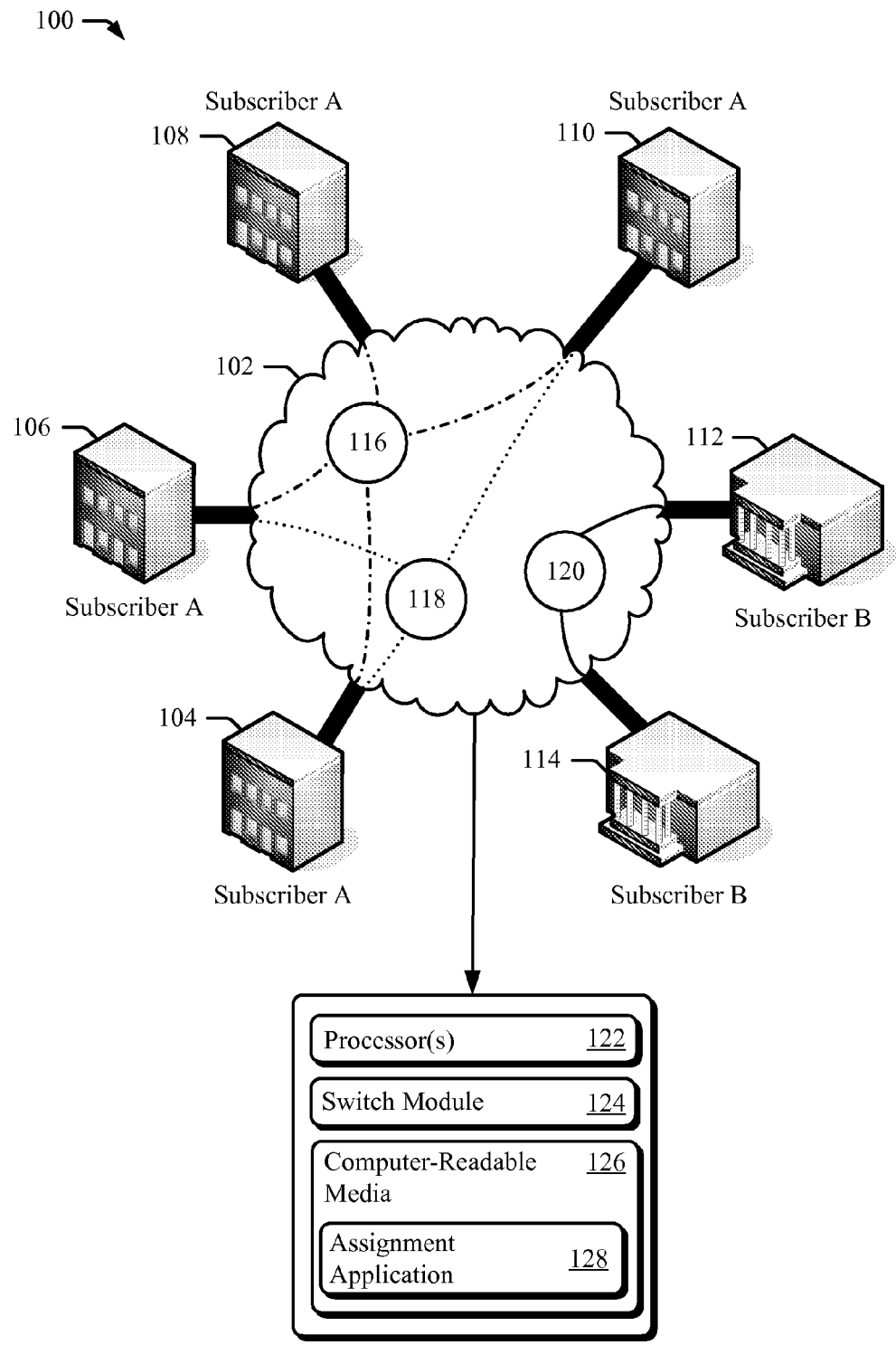
FIG. 1 illustrates an exemplary operating environment in which various embodiments of the tools may operate.

FIG. 1 illustrates one operating environment generally at 100 that accommodates a plurality of network services and assigns packets to one of the network services. The environment includes an access network 102; four subscriber locations associated with subscriber "A" 104, 106, 108, 110; two subscriber locations associated with subscriber "B" 112, 114; and three network services 116, 118, 120.

Each network service allows subscriber locations associated with the network service to communicate with other subscriber locations associated with the network service. For example, network service 116 provides connectivity between locations 104, 106, 108, and 110, each of which belong to subscriber "A." Subscriber "A" may use this network service to relay general business communication such as email between its four locations. Locations 112 and 114 are not associated with network service 116 and therefore may not communicate with locations 104, 106, 108, and 110 via network service 116. This is a desirable characteristic of network service 116 since locations 112 and 114 belong to subscriber "B" rather than subscriber "A."

Similarly, network service 118 provides connectivity between locations 104, 106, and 110, each of which belong to subscriber "A." Subscriber "A" may use this network service to relay a particular type of business communication between the three locations associated with the network service. For example, locations 104 and 106 may each house employees who use a customer relationship management (CRM) database and location 110 may house the CRM database. Location 108 need not be associated with network service 118 since location 108 does not house devices that need access to the CRM database. Locations not associated with network service 118 may not communicate with locations 104, 106, and 110 via network service 118.

Network service 120 provides connectivity between locations 112 and 114, which belong to subscriber "B." Locations not associated with network service 120, such as the locations belonging to subscriber "A," may not communicate with locations 112 and 114 via network service 120.

As described above, the access network may support more than one subscriber, such as subscribers "A" and "B," and may accommodate one or more network services for each subscriber. If desirable, the access network may also support network services that allow communication between subscribers, such as a network service associated with location 104 and location 114.

The access network comprises one or more devices capable of relaying data packets, such as switches or routers. These devices are not illustrated in FIG. 1. The devices assign packets received from a subscriber location to a network service and relay the packets though the access network to another subscriber location associated with the network service.

Each device comprising the access network that receives packets from a subscriber location may comprise one or more processor(s) 122, a switch module 124, and computer-readable media 126. The computer-readable media includes an assignment application 128 comprising a set of executable instructions that when executed assign packets to a network service.

The switch module 124 may comprise one or more switch chips capable of forwarding data packets from one switch port to another switch port. The processor(s) are capable of accessing and/or executing the computer-readable media and may be further capable of configuring the switch module to operate in a particular manner. In some embodiments, the switch module may access and/or execute portions of the computer-readable media.

Each switch may alternatively comprise a programmable logic device, such as a Field Programmable Gate Array (FPGA), and the computer-readable media 126. In this embodiment, the FPGA is capable of accessing and/or executing the computer-readable media, including the assignment application and forwarding data packets from one switch port to another switch port.

In yet another alternative embodiment, each switch may comprise a network processor and computer-readable media. In this embodiment, the network processor is capable of accessing and/or executing the computer readable media, including the assignment application and forwarding data packets from one switch port to another switch port.

Exemplary Embodiments for Assigning a Packet to a Network Service

In order to segregate packets properly within an access network according to the network services with which the packets are associated, the access network may assign packets it receives from a subscriber to a network service before forwarding the packets within the access network. The assignment application performs this function for the access network.

Figure 2:
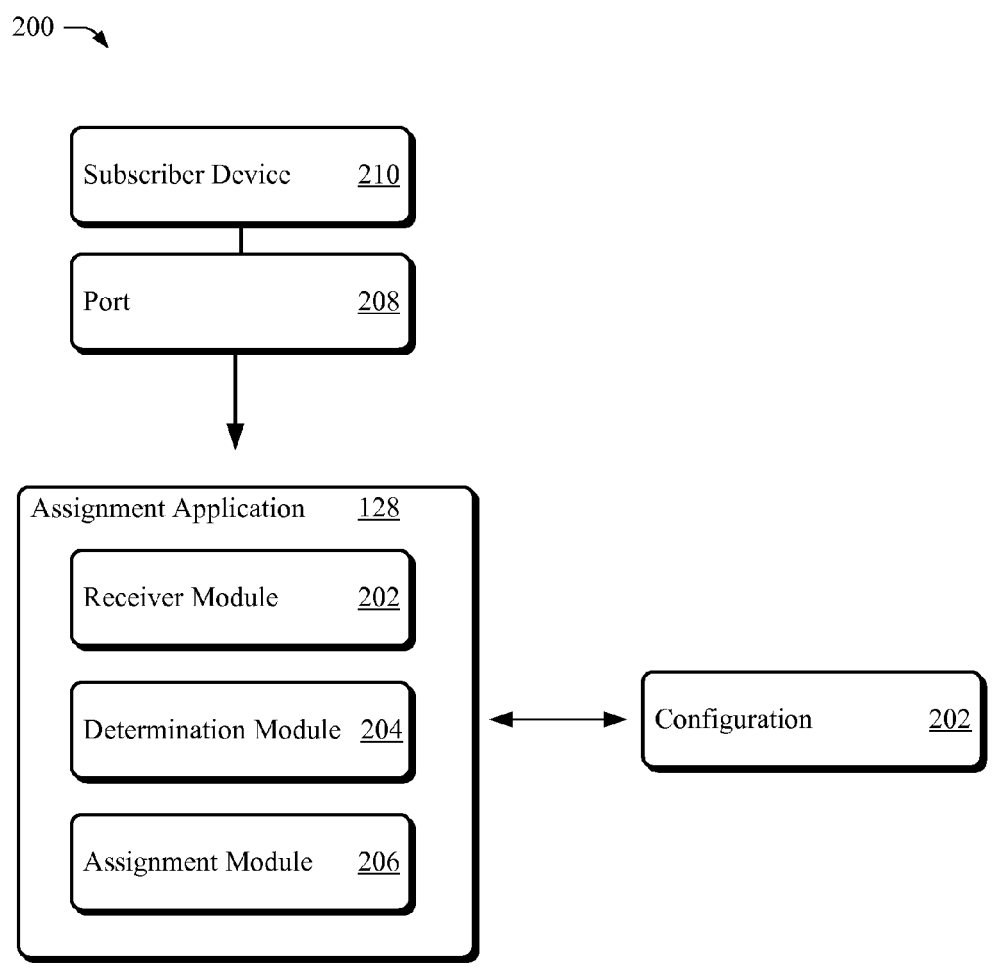
FIG. 2 is an exemplary block diagram illustrating an application capable of assigning packets to a network service.

FIG. 2 is a block diagram 200 illustrating an exemplary assignment application 128, a subscriber device 210 connected to a port 208 and a configuration 202. The assignment application comprises a receiver module 202, a determination module 204, and an assignment module 206.

The port receives a packet on a physical link connected to the subscriber device and forwards the packet to the receiver module. The receiver module may queue a plurality of received packets if necessary. The port may be a port of a switch, router, or other device capable of forwarding packets.

The determination module 204 examines the packet and determines whether the packet is a control packet or a data packet. A control packet is a packet comprising a request that a device receiving the control packet make a behavior or configuration change.

For example, the control packet may be an Ethernet Bridge Protocol Data Unit (BPDU) that relays information regarding the state of a spanning tree. The BPDU may request that a switch receiving the BPDU block a particular port, leading to a network change. Similarly, the control packet may be an Ethernet discovery-protocol packet that requests that a device receiving the discovery-protocol packet reply with a message containing information about the receiving device such as the device's manufacturer, model number, number of ports, and the like. Other control packets are also well known to those of skill in the art.

The determination module may determine whether the packet is a control packet or a data packet by examining particular fields of the packet, by determining the length of the packet, by searching for a particular bit sequence in the packet, or by other established means of identifying control packets.

In some embodiments, the determination module may not only determine that the packet is a control packet but may also distinguish between different types of control packets. For example, the determination module may determine that a packet is not only a control packet, but, more specifically, that it is a BPDU. Similarly, the determination module may be able to determine that the packet is a flow control packet. This ability to distinguish between control packets may be used to assign different types of control packets to different network services.

The determination module may also determine whether the packet includes a tag. The tag may occupy a portion of the packet and is capable of being used to associate the data packet with a network service. The tag may comprise a Virtual Local Area Network (VLAN) tag, a Multiprotocol Label Services (MPLS) tag, or other tag.

Once the determination module has determined whether the packet is a control packet or a data packet and whether the packet has a tag, the determination module may determine a network service to which the packet will be assigned. The determination module may consult a configuration in making this determination.

The configuration 202 may comprise a set of network tags along with a set of corresponding network services, each network tag being associated with one of the network services. The configuration may be specifically associated with the port and other ports of the switch or router may have different configurations.

The determination module may search the set of network tags to find a network tag that matches the packet's tag. If the determination module finds a match, the network service associated with the matching network tag is the network service to which the assignment module will assign the packet. The configuration may also specify a network service for tagged packets having no matching network tag in the configuration.

In addition, the configuration may specify one network service for untagged control packets and another network service for untagged data packets. Alternatively, the configuration may specify a single network service for both untagged control packets and untagged data packets. In some embodiments, the configuration may specify one network service for one type of control packets, such as BPDUs, and another network service for another type of control packets, such as a flow control packets.

The determination module may also consider portions of the packet other than the tag when determining which network service a packet should be assigned to. The other portions may include a class of service field, a type of service field, an experimental field, a source address field, a destination address field, a label field, or other fields of a packet well known to those of skill in the art.

For example, the configuration may specify that packets having a particular tag value and a particular class of service value be assigned to one network service but packets having the same particular tag value and a different class of service value be assigned to a different network service.

The assignment module 206 assigns the packet to the network service identified by the determination module. In one embodiment of the assignment module, the assignment module may assign the packet to the network service by adding a tag associated with the network service to the packet. If the packet already has a tag, the assignment module may add an additional tag to the packet. Alternatively, the assignment module may replace the existing tag with the tag associated with the network service.

Once the assignment module has added the tag, devices within the access network to which the packet is subsequently forwarded may, in response to detecting the tag, confine the packet to particular ports of the device belonging to the network service associated with the tag. In this manner, the packet is confined to subscriber locations associated with the network service.

In another embodiment of the assignment module, the assignment module assigns the packet to a virtual switch associated with the network service identified by the determination module. The virtual switch may be associated with a single network service and may comprise a plurality of ports.

The virtual switch forwards each packet it receives to one of its ports based on a destination address field of the packet. Each virtual switch may be connected through its ports to other devices within the access network. These other devices may also comprise virtual switches that are associated with the network service.

Once assigned to a virtual switch, a packet may be forwarded from device to device through the access network, being handled in each device by a virtual switch associated with the network service until the packet is forwarded to a subscriber location also associated with the network service. The combination of virtual switches associated with the network service confine packets assigned to the network service to the subscriber locations that are also associated with the network service. In one embodiment, the combination of virtual switches forming the network service comprise an MPLS label switched path. Assignment to a virtual switch is further discussed below in relation to FIG. 5.

Figure 3:
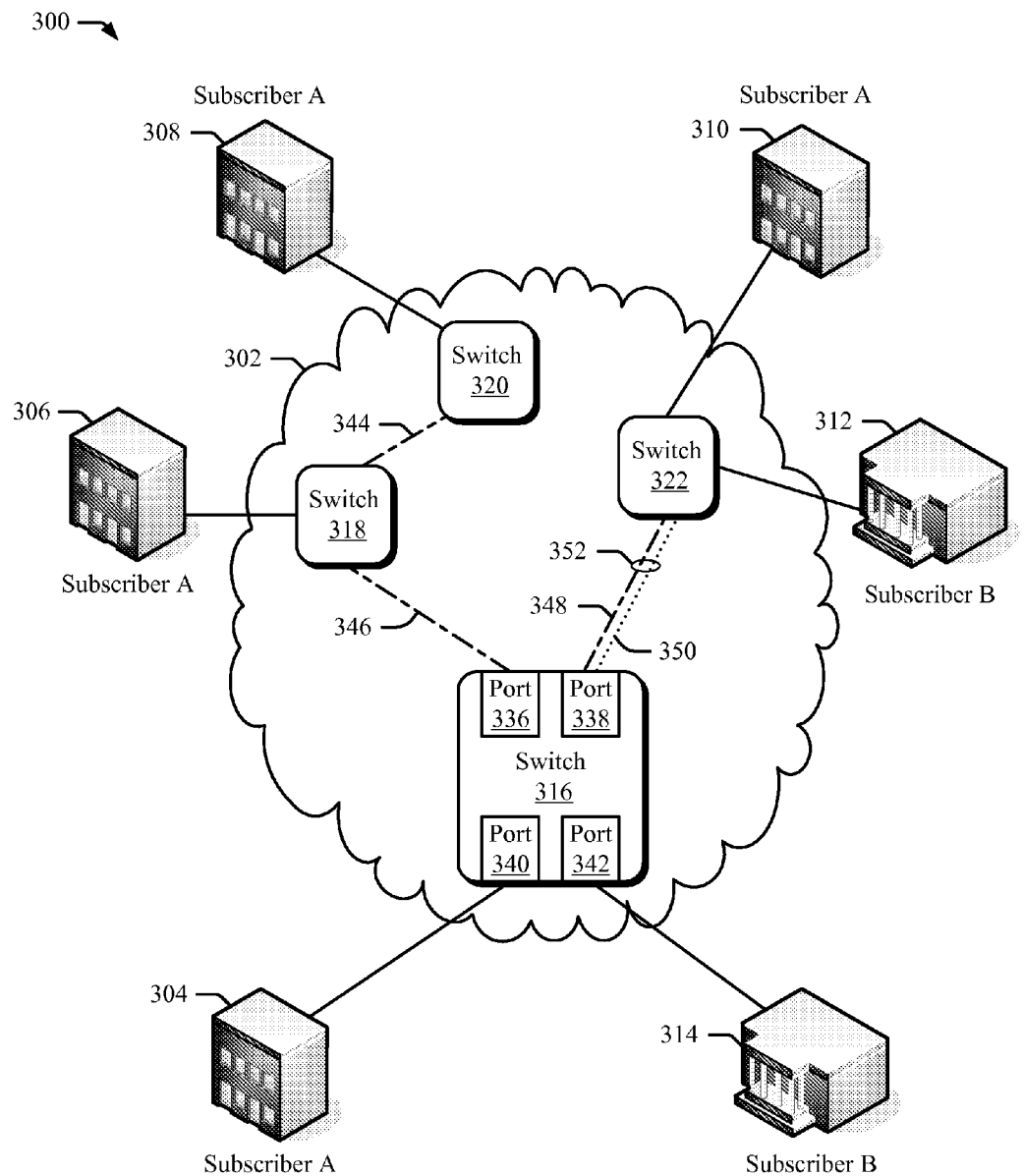
FIG. 3 illustrates an exemplary network capable of assigning packets to a network service in a first configuration.

The assignment application may be used in the devices of an access network that are connected to subscriber locations to assign packets received from the subscriber locations to network services. FIG. 3 illustrates an exemplary network 300 comprising packet switches that utilize the assignment application.

The network 300 includes an access network 302; four subscriber locations associated with subscriber "A" 304, 306, 308, 310; and two subscriber location associated with subscriber "B" 312, 314. The access network includes four switches 316, 318, 320, 322 connected to the subscriber locations. Switch 316 is depicted as having four ports 336, 338, 340, 342. Each of the other switches 318, 320, 322 also has ports, but these ports are not depicted for simplicity.

Four logical links are depicted 344, 346, 348, 350. Each logical link relays packets associated with a particular network service between two switches. Exemplary logical links 344, 346, and 348 are each associated with a first network service. Logical link 350 is associated with a second network service.

Each logical link relies on an underlying physical link to relay packets. A plurality of logical links may be multiplexed onto a single physical link. For example, physical link 352 relays logical link 348 and logical link 350. Physical links also relay logical links 344 and 346. In the interest of simplicity, these physical links are not depicted.

The first network service connects each of the four subscriber locations 304, 306, 308, 310 of subscriber "A" together. Similarly, the second network service connects each of the two subscriber locations 312, 314 of subscriber "B" together.

In designing a network service, a service provider may want to provide a network service that is transparent to control packets. A transparent network service relays control packets received from one subscriber location to one or more of the other subscriber locations associated with the network service rather than allowing an access-network switch that receives the control packet to perform the action requested by the control packet.

A transparent network service ensures the service provider that a subscriber will not be able to send a control packet into the access network that will alter the configuration or behavior of the access network since control packets received by the transparent network service are relayed by the transparent network service rather than being inspected and processed by the transparent network service.

A network service that is transparent to control packets may be realized using the assignment application described above in relation to FIG. 2 to assign control packets received from a subscriber location to a network service. Once a control packet has been assigned to a network service, access-network switches that subsequently forward the control packet may not act on the control packet because they recognize that the control packet has been assigned to a network service and is not intended for the access-network switch.

For example, if the assignment application adds a tag to the control packet, access-network switches comprising the assignment application that subsequently forward the control packet will recognize the tag and will consequently forward the control packet rather than performing the action requested by the control packet.

The first network service illustrated in FIG. 3 comprising logical links 344, 346, and 348 is a transparent network service that relays control packets between the four subscriber locations associated with subscriber "A." The following exemplary sequence of events demonstrates how the first network service transparently relays control packets.

First, a control packet sent by subscriber location 304 is received on port 340 of switch 316. An assignment application residing on switch 316 assigns the control packet to the first network service according to a configuration. The configuration may specify that any untagged control packets received on port 340 are assigned to the first network service.

The switch then forwards the control packet on port 336 to switch 318 and on port 338 to switch 322. Switch 318 forwards the control packet to subscriber location 306 and switch 320. Switch 320 forwards the control packet to subscriber location 308. Switch 322 forwards the control packet to subscriber location 310. Switches 316, 318, 320, and 322 do not perform the action requested by the control packet.

Similarly, a control packet sent by subscriber location 314 is received on port 342 of switch 316. The assignment application assigns the control packet to the second network service according to a configuration. The configuration may specify that any untagged control packets received on port 342 are assigned to the second network service.

The switch then forwards the control packet on port 338 to switch 322. Switch 322 forwards the control packet to subscriber location 312. Switches 316 and 322 do not perform the action requested by the control packet. Notice that switch 316 receives untagged control packets on ports 340 and 342 and assigns control packets received on port 340 to one network service and control packets received on port 342 to another network service. Assigning control packets to a network service based on the port on which the control packets are received enables the switch to assign control packets from subscriber "A" to a different network service than control packets from subscriber "B."

In one embodiment, the assignment application assigns control packets to a network service by adding a tag to the control packets. The switches of the access network use the tag to identify the control packet as belonging to a particular network service. Once the control packet reaches the access-network switch connected to the destination subscriber location, the tag may be removed from the control packet so that the destination subscriber location receives the control packet untagged.

The switches of the access network may be configured to handle untagged data packets received from a subscriber location in a similar manner. For example, a first network service may be configured to relay untagged data packets between each of the subscriber locations associated with subscriber "A" and a second network service may be configured to relay untagged data packets between each of the subscriber locations associated with subscriber "B."

The port of the access-network switch that the untagged data packets arrive on may be used to distinguish untagged data packets belonging to subscriber "A" and untagged data packets belonging to subscriber "B." For example, a configuration for switch 316 may specify that untagged data packets arriving on port 340 be assigned to one network service and untagged data packets arriving on port 342 be assigned to a different network service.

Figure 4:
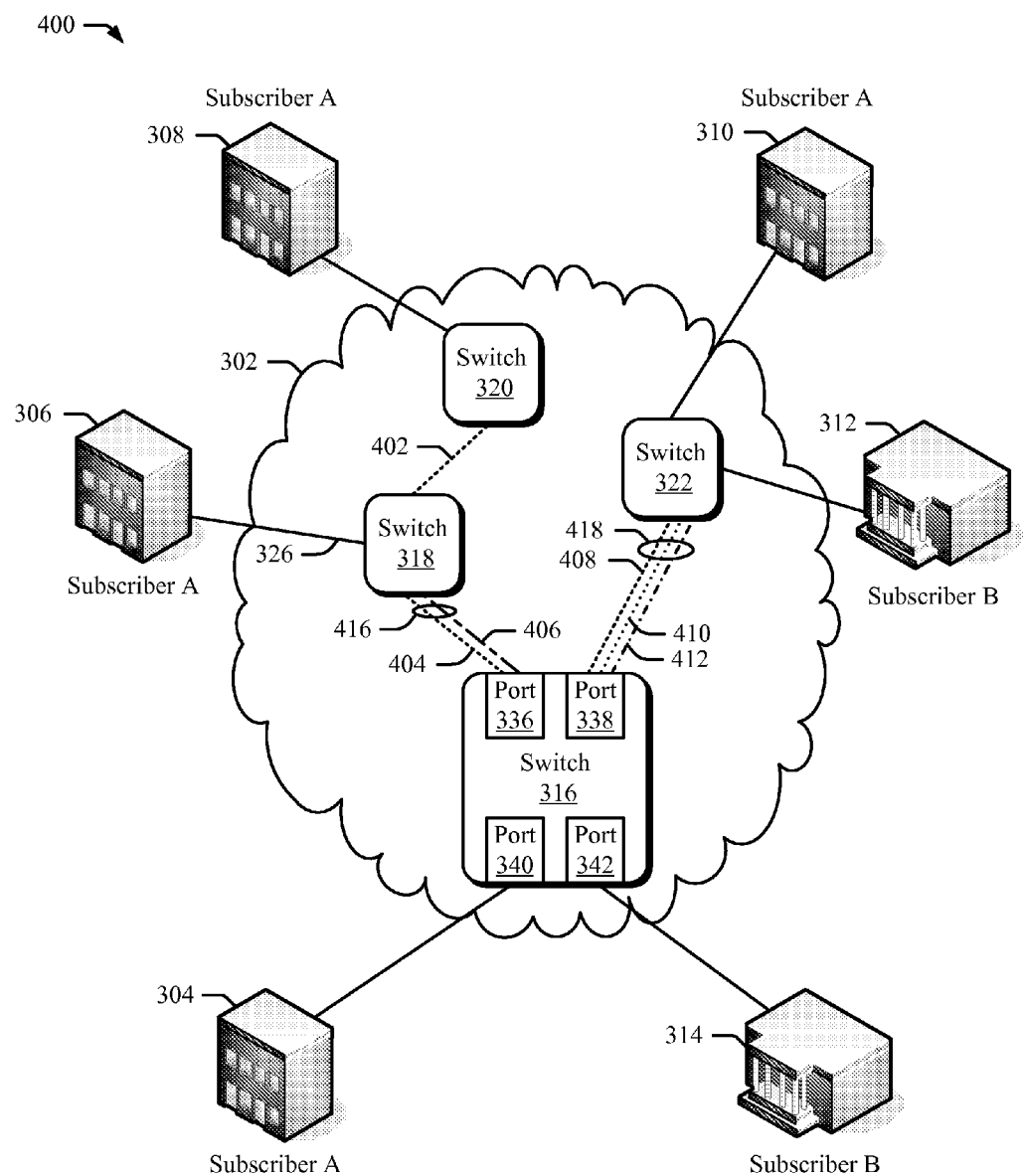
FIG. 4 illustrates an exemplary network capable of assigning packets to a network service in a second configuration.

FIG. 4 illustrates another exemplary network 400. The elements of exemplary network 400 are substantially the same as exemplary network 300. Exemplary network 400, however, has a different configuration than exemplary network 300.

Six logical links are depicted: 402, 404, 406, 408, 410, and 412. Each logical link relays packets associated with a particular network service between two switches. Exemplary logical links 402, 404, and 408 are each associated with a first network service; exemplary logical link 406 is associated with a second network service; and exemplary logical link 412 is associated with a third network service.

Logical links 404 and 406 are multiplexed onto physical link 416. Similarly, logical links 408, 410, and 412 are multiplexed onto physical link 418. A physical link also relays logical link 402, but this physical link is not illustrated for simplicity.

The first network service connects each of the four subscriber locations 304, 306, 308, 310 of subscriber "A" together. This first network service may be used for communication involving all four subscriber locations, such as email.

The second network service connects subscriber locations 304 and 306 together, which are both locations associated with subscriber "A." Subscriber locations 308 and 310, however, are not part of the second network service even though they are associated with subscriber "A." The second network service may relay information that needs to be shared between subscriber locations 304 and 306 but that should not be available to subscriber locations 308 and 310.

For example, subscriber locations 308 and 310 may house administrative staff, subscriber location 304 may house a call center where customer service representatives handle customer calls, and subscriber location 306 may house databases used by the call center, such as a billing database and a customer information database. Since the call center needs access to the databases, but the administrative staff does not, the second network service connects subscriber locations 304 and 306 and excludes subscriber locations 308 and 310.

The third and fourth network services each connect the two subscriber "B" locations 312, 314 together. Subscriber "B" may use the two network services to distinguish high priority communication from lower priority communication. For example, the third network service may be used for high priority VoIP packets that are sensitive to delay and the fourth network service may be used for other communication, such as email, that is not as sensitive to delay as VoIP packets.

A configuration, such as the configuration described above in relation to FIG. 2, associates each of the network services with one or more of the ports of switch 316. In this exemplary embodiment, the configuration associates port 340 of switch 316 with the first and second network services since port 340 is connected to subscriber location 304, which belongs to subscriber "A," and since the first and second network services are network services that connect locations belonging to subscriber "A."

Similarly, the configuration associates port 342 with the third and fourth network services since port 342 is connected to subscriber location 314, which belongs to subscriber "B," and since the third and fourth network services are network services that connect locations belonging to subscriber "B."

The configuration may specify that packets received on port 340 having a tag with a tag value of one hundred be assigned to the first network service, that packets having a tag with any other tag value are to be assigned to the second network service. Subscriber "A" may not anticipate sending any untagged packets and may therefore request that the configuration specify that untagged packets received on port 340 are to be discarded.

In one embodiment, an assignment application, substantially similar to the assignment application described above in relation to FIG. 2, resides on switch 316. As packets are received from subscriber location 304 on port 340, the assignment application assigns the packets to either the first network service or the second network service based on the configuration. Accordingly, the assignment application assigns packets having a tag with a tag value of one hundred to the first network service and packets having any other tag value to the second network service.

Switch 316 relays tagged packets having a tag value other than one hundred that it receives from subscriber location 304 on the second network service. Conveniently, the assignment application need not know beforehand what tag value it will receive subscriber location 304. Instead, the assignment application merely determines that these packets have a tag with a value other than one hundred.

The fact that the assignment application need only determine that the tag value is something other than one hundred is useful because if subscriber "A" starts using a previously unused new tag value, the assignment application does not have to be configured with the new tag value.

The configuration also specifies how packets received on port 342 are assigned to the third and fourth network services. The configuration may specify that untagged packets received on port 342 be assigned to the third network service and packets having any tag be assigned to the fourth network service.

This configuration may be used to treat some packets received at port 342 with a higher priority than other packets. For example, the access network may give priority to the fourth network service over the third network service. Accordingly, tagged packets, which are assigned to the fourth network service, will be given priority over untagged packets, which are assigned to the third network service.

The fact that the assignment application need only determine that a packet is tagged in order to assign the packet to the fourth network service is useful because if subscriber "B" wants packets having a previously unused tag value to be treated with high priority, it can merely start sending packets with the tag value to switch 316. Switch 316 does not need to know what the new tag value is since all switch 316 need do is determine whether the packet is tagged or untagged.

As was discussed above in relation to FIG. 2, the assignment application may assign packets to a network service in a number of ways. In one embodiment, the assignment application assigns packets to a network service by assigning the packets to a virtual switch.

Figure 5:
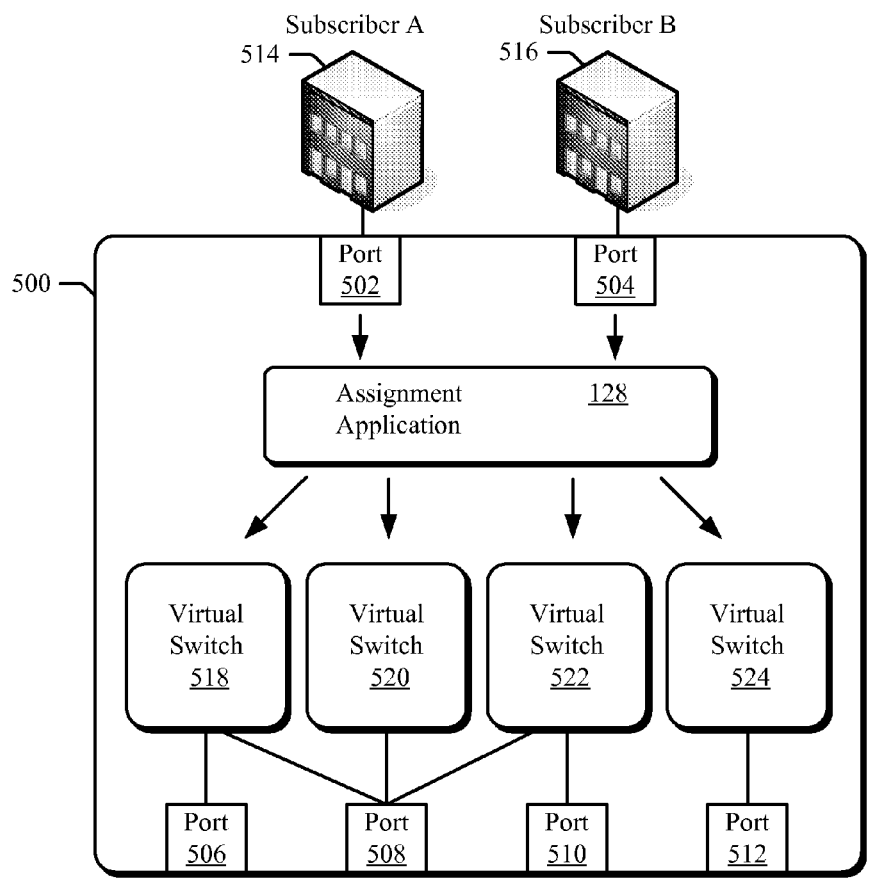
FIG. 5 illustrates an exemplary switch capable of assigning packets to a virtual switch associated with a network service as well as an exemplary configuration table.

FIG. 5 illustrates an exemplary switch 500 capable of assigning packets to a virtual switch. The switch includes six ports 502, 504, 506, 508, 510, 512. Port 502 is connected to a subscriber location 514 belonging to subscriber "A" and port 504 is connected to a subscriber location 516 belonging to subscriber "B." The switch also includes four virtual switches 518, 520, 522, 524. Each of the virtual switches is connected to at least one of ports 506, 508, 510, and 512.

An exemplary configuration 550 used by the assignment application to assign packets to a network service is also illustrated. The configuration specifies that packets received on a particular port and having a particular tag are assigned to a particular virtual switch. The configuration also specifies an association between each virtual switch and a network service. Thus, by assigning a packet to a virtual switch, the packet is also assigned to the network service associated with the virtual switch.

The virtual switch, however, is internal to the switch and is therefore not necessarily known to other switches comprising an access network. To make the assignment of a packet to a network service explicit, the packet is marked with a tag associated with the network service. The tag enables the other switches of the access network to identify the network service to which a packet has been assigned. In one embodiment, the tag is a VLAN tag. In other embodiments, the tag may be an MPLS tag, or other tag well known to those of skill in the art.

The packet may be marked with the tag before it is forwarded to a virtual switch. In this instance, assigning the packet to a network service comprises marking the packet. Alternatively, the packet may be marked with the tag after the packet leaves the virtual switch but before one of the ports of the switch transmits the packet to another switch. In this instance, assigning the packet to a network service comprises forwarding the packet to the virtual switch.

The network operator may coordinate tag values among the switches comprising a network service so that a particular tag value uniquely associates a packet with a particular network service. Thus, a switch that subsequently receives a marked packet may inspect the packet, find the tag, and assign the packet to a virtual switch that is associated with the same network service as the tag.

Marking a packet with a tag may comprise adding a tag to an untagged packet, replacing an existing tag of a tagged packet, or adding a tag to a tagged packet so that the packet has more than one tag. If a tag is added to a tagged packet, the tag may be added in such a way that the original tag is effectively concealed from switches that inspect the packet.

Each virtual switch comprises two or more interfaces on which data packets may be sent and received. Each virtual switch forwards a data packet received on one of its interfaces to one of its other interfaces based on the data packet's destination address. Once a data packet has been assigned to a virtual switch, it is confined to that virtual switch and prevented from being forwarded to an interface associated with a different virtual switch.

Each virtual switch interface is associated with one of the ports of the switch. The number of interfaces each virtual switch has may vary from virtual switch to virtual switch. Some virtual switches may have as few as two interfaces and therefore are associated with only two of the switch's ports. Other virtual switches may have an interface associated with each of the switch's ports.

In the exemplary embodiment depicted in FIG. 5, the switch comprises four virtual switches. The switch may, however, comprise fewer than four virtual switches, or may comprise more than four virtual switches. In fact, the number of virtual switches may change over time if the configuration changes over time.

A single switch port may be associated with more than one virtual switch. In such a configuration, the port multiplexes packets it receives from each of the virtual switches with which it is associated onto a single link connected to the port. For example, port 508 is associated with virtual switches 518, 520, and 522.

In one embodiment, the switch comprises a conventional Ethernet switch chip used to realize each of the virtual switches. In this embodiment, each virtual switch comprises a VLAN. The switch chip is capable handling a plurality of VLANs and thus a plurality of virtual switches.

In this embodiment, the assignment module assigns a packet to a virtual switch by adding a tag associated with the VLAN that comprises the virtual switch to the packet and forwarding the packet to the switch chip. The tag may comprise a VLAN tag conforming to the Institute of Electrical and Electronics Engineers (IEEE) 802.1Q standard, or other VLAN standard well known to those of skill in the art such as IEEE 802.1ad. The switch chip then forwards the packet to one of its other ports belonging to the VLAN based on the destination address of the packet.

In another embodiment, the switch realizes virtual switches by forwarding packets based on metadata. In this embodiment, the switch maintains metadata for each packet it receives. The metadata is information about the packet, such as the port on which the packet was received. The switch compares a packet's metadata to a set of forwarding rules when forwarding the packet. The forwarding rules may restrict the switch to a subset of the switch's ports when forwarding the packet rather than allowing the packet to be forwarded to any of the switch's ports.

By restricting the ports to which the packet may be forwarded, the rules create a set of virtual switches, each of which may be associated with a subset of the switch ports rather than all of the switch ports. In addition, the rules may specify that a tag be added to the packet before the packet is transmitted by the switch so that a device that subsequently receives the packet is able to identify the network service to which the packet belongs.

In yet another embodiment, the switch realizes virtual switches by using a switching fabric capable of associating a particular virtual switch identifier with each packet received by the switching fabric. The virtual switch identifier may be associated with the packet based on: the port the data packet was received on; the presence or absence of a tag in the packet; the value of the tag, if present; whether the packet is a control packet or a data packet; and other attributes of the packet.

The switching fabric forwards the packet to a switching fabric port associated with the particular virtual switch identifier based on a destination address portion of the packet. In forwarding the packet, the switching fabric prevents the packet from being forwarded to a switching fabric port not associated with the particular virtual switch identifier. In this manner, the switching fabric realizes a virtual switch for each virtual switch identifier.

Four exemplary packet assignments within the exemplary configuration of FIG. 5 will now be described. In the first exemplary assignment, the switch 500 receives a tagged data packet having a tag value of one hundred on port 502 from subscriber location 514. The switch relays the tagged data packet to the assignment application 128, which consults the configuration 550 to determine the network service to which it should assign the packet.

Since row 552 of the configuration specifies that tagged data packets having a tag value of one hundred are to be assigned to virtual switch 518, which is associated with network service A, the assignment application assigns the tagged data packet to virtual switch 518. Virtual switch 518 forwards the tagged data packet to either port 506, port 508, or ports 506 and 508 based on a destination address that is part of the tagged data packet. The switch prevents virtual switch 518 from forwarding the tagged data packet to ports 510 and 512, even if the destination address of the tagged data packet specifies that the tagged data packet should be forwarded to one of those ports, since neither of those ports are associated with virtual switch 518.

Virtual switch 518 also marks the tagged data packet with a tag associated with network service A in one of the above-described manners. Port 506, port 508 or both ports then forward the marked data packet either to a destination subscriber location or to another switch capable of forwarding the data packet within the confines of network service A to a destination subscriber location.

In the second exemplary assignment, the switch 500 receives a tagged data packet having a tag value of two hundred on port 502 from subscriber location 514. The switch relays the tagged data packet to the assignment application 128, which consults the configuration 550 to determine the network service to which it should assign the packet.

Since the data packet has a tag value of two hundred, row 552 of the configuration does not apply to the data packet. Row 554, however, does apply to the data packet since it specifies that tagged data packets having a tag value other than one hundred are to be assigned to virtual switch 520 which is associated with network service B. Accordingly, the assignment application assigns the tagged data packet to virtual switch 520.

Virtual switch 520 forwards the tagged data packet to port 508, since port 508 is the only port other than port 502 that is associated with virtual switch 520, and marks the tagged data packet with a tag associated with network service B in one of the above-described manners. Port 508 then forwards the marked data packet either to a destination subscriber location or to another switch capable of forwarding the data packet within the confines of network service B to a destination subscriber location.

In the third exemplary assignment, the switch 500 receives an untagged control packet on port 504 from subscriber location 516. The switch relays the control packet to the assignment application 128, which consults the configuration 550 to determine the network service to which it should assign the control packet.

Since the control packet is untagged, row 556 of the configuration applies to the control packet. Accordingly, the assignment application assigns the control packet to virtual switch 522. Virtual switch 522 forwards the control packet to either to port 508, port 510, or port 508 and port 510 based on a destination address that is part of the control packet.

Virtual switch 522 also marks the control packet with a tag associated with network service C in one of the above-described manners. Finally, the port to which virtual switch 522 forwards the control packet forwards the marked control packet to either a destination subscriber location or another switch capable of forwarding the data packet within the confines of network service C to a destination subscriber location.

In the final exemplary assignment, the switch 500 receives a tagged control packet on port 504 from subscriber location 516. Although the control packets described above in relation to the exemplary configuration of FIG. 3 were untagged, some control packets may include tags, as this final exemplary assignment illustrates. The switch relays the control packet to the assignment application 128, which consults the configuration 550 to determine the network service to which it should assign the control packet.

Since the control packet is tagged, row 558 of the configuration applies to the control packet. Accordingly, the assignment application assigns the control packet to virtual switch 524. Virtual switch 524 forwards the control packet to port 512, since port 512 is the only port other than port 504 that is associated with virtual switch 524, and marks the control packet with a tag associated with network service D in one of the above-described manners. Finally, the port to which virtual switch 524 forwards the control packet forwards the marked control packet to either a destination subscriber location or another switch capable of forwarding the data packet within the confines of network service D to a destination subscriber location.

Of course, packets may be received on ports 506, 508, 510, and 512 as well as ports 502 and 504. If these packets are received directly from a subscriber location, the packets are assigned to a virtual switch by the assignment application in a manner similar to that described above for packets received on ports 502 and 504 using a configuration not illustrated in FIG. 5.

Figure 6:
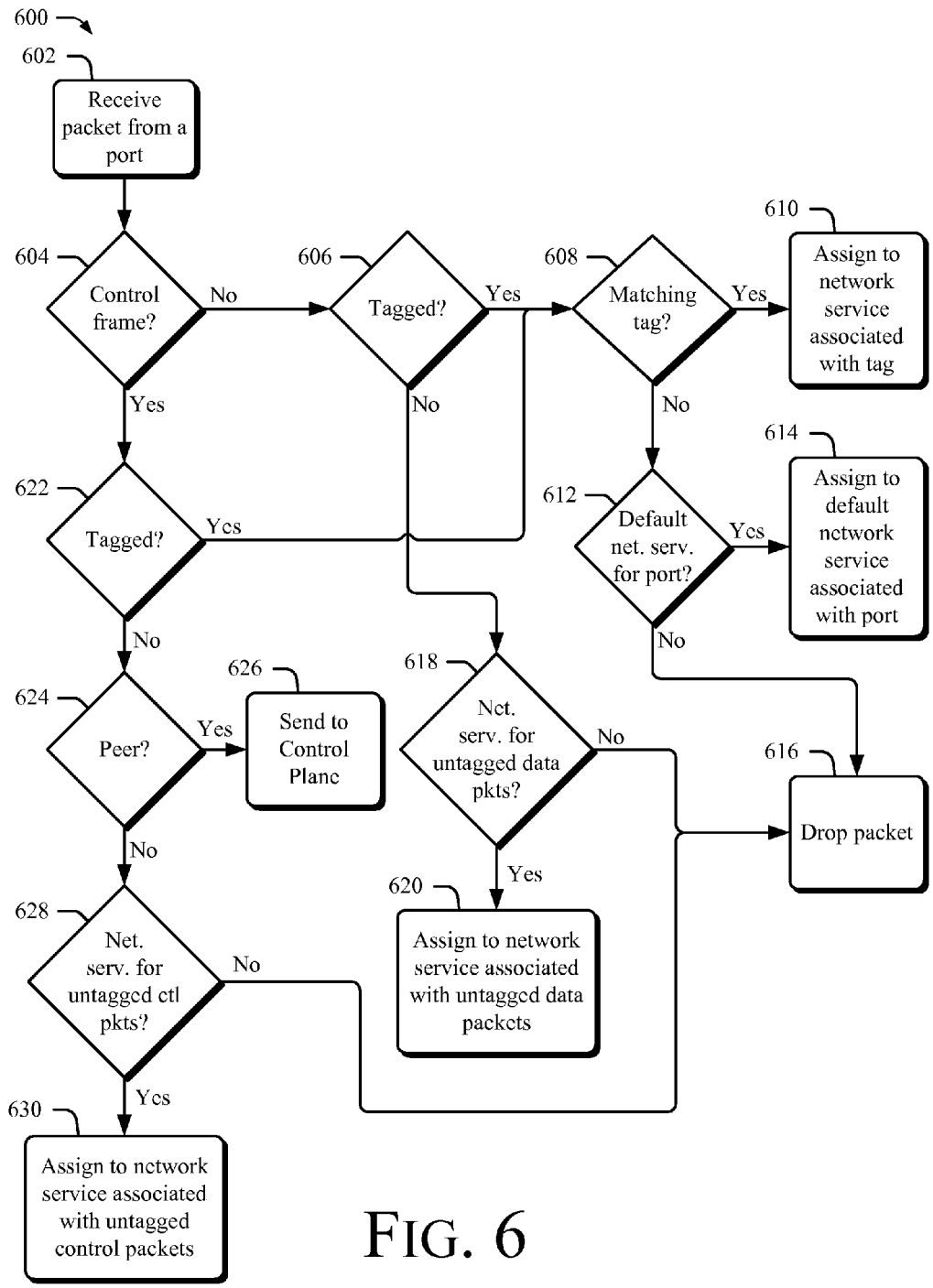
FIG. 6 illustrates an exemplary process for assigning packets to a network service.

FIG. 6 illustrates a method 600 that the assignment module may use in assigning packets to a network service. At 602, the assignment module receives a packet from a port. At 604, the assignment module determines whether the packet is a control packet. If the packet is a not control packet, the assignment module determines 606 whether the packet is tagged. If the packet is tagged, the assignment module determines 608 whether the packet's tag matches one of a set of network tags associated with the port. If the packet's tag matches a network tag, the assignment application assigns 610 the packet to a network service associated with the matching network tag.

If the packet's tag does not match one of the network tags, the assignment application determines 612 whether a default network service is associated with the port. If a default network service is associated with the port, the assignment application assigns 614 the packet to the default network service. The assignment application assigns data packets that are tagged, but which have a tag that does not match any of the network tags associated with the port to the default network service.

Packets having a variety of different tag values may therefore be assigned to the default network service. Network services such as the fourth network service described above in relation to FIG. 4 and network service "D" described above in relation to FIG. 5 may be considered default network services. If a default network service is not associated with the port, the packet is dropped 616.

Returning now to decision 606, if the packet is not tagged, the assignment application determines 618 whether the port is configured with a network service associated with untagged data packets. If a network service associated with untagged data packets is configured, the assignment application assigns 620 the packet to the network service associated with untagged data packets. If there is no network service associated with untagged data packets, the packet is dropped 616.

Returning now to decision 604, if the packet is a control packet, the assignment application determines 622 whether the control packet is tagged. If the control packet is tagged, the assignment application proceeds to decision 608 and follows the method described above in relation to tagged data packets.

If the control packet is untagged, the assignment application determines 624 whether the control packet is to be peered. Control packets received by a packet switch may be assigned to a network service by the assignment application, or may be peered by the packet switch. As was described above in relation to FIG. 2, control packets comprise a request that a device receiving the control packet make a behavior or configuration change. If the packet switch carries out the request made by a control packet, the control packet is considered a peered control packet.

Many different control protocols are used in packet networks. While some of these control protocols may be effectively assigned to a network service, others, such as flow control packets, are best handled as peered protocols. Flow control packets may be sent by a first switch to a connected second switch to request that the second switch cease sending packets to the first switch for a period of time as a way of correcting a mismatch between the rate at which the second switch sends packets and the rate at which the first switch receives packets.

Since the mismatch is confined to the first switch and the second switch, the mismatch would not be corrected by assigning flow control packets received by the second switch from the first switch to a network service that would relay the flow control packets to another switch not involved in the mismatch. Consequently, rather than assigning the flow control packets to a network service, the assignment application may determine that flow control packets are peered (processed) by the second switch rather than assigned to a network service.

Accordingly, some types of control packets, such as flow control packets, may be peered while other types, such as spanning tree BPDUs, may be assigned to a network service. The assignment application may inspect each control packet, as part of determination 624, to determine a type for the control packet. The assignment application may then refer to a configuration describing which control packet types are to be peered and which are to be assigned to a network service to determine whether a particular control packet should be peered or assigned to a network service.

If a control packet is to be peered, the assignment application sends 626 the control packet to a control plane of the packet switch. The control plane inspects the control packets it receives and may carry out the request made by the control packet. For example, if the control plane receives a flow control packet, it may process the flow control packet and, as a result of the processing, suspend transmission of packets by a port of the packet switch for a period of time. In one embodiment, the control plane comprises a microprocessor.

Returning now to decision 624, if the control packet is peered, the assignment application determines 628 whether the port is configured with a network service associated with untagged control packets. If a network service associated with untagged control packets is configured, the assignment application assigns 630 the control packet to the network service associated with untagged control packets. If there is no network service associated with untagged control packets, the packet is dropped 616.

Other Embodiments of the Tools

Figure 7:
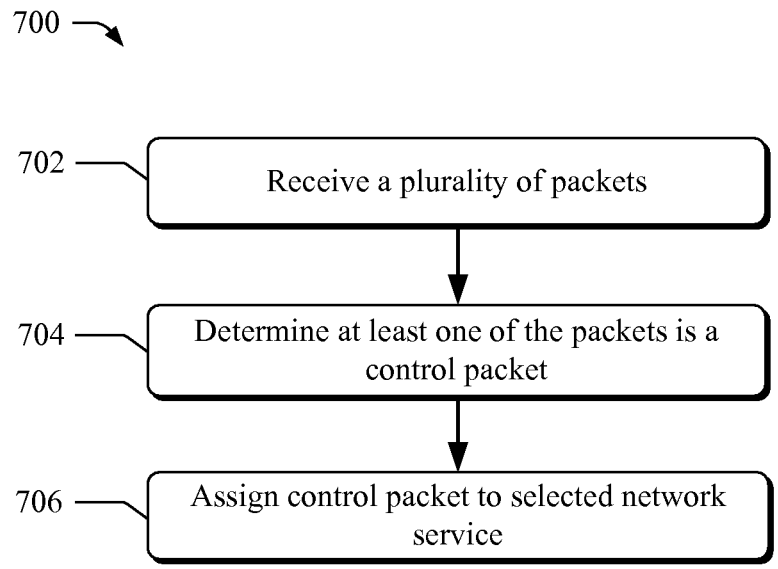
FIG. 7 is an exemplary process illustrating various embodiments and manners in which the tools assign a control packet to a selected network service.

The section above describes exemplary ways in which the tools assign packets to a network service. The section below describes additional embodiments of the tools, including processes. Each of the processes below may be performed by a switch through computer-executable instructions on computer-readable media, hardware, a combination of both, or otherwise. FIG. 7 illustrates a process 700 as a series of blocks representing individual operations or acts performed by the tools.

At block 702, the tools receive a plurality of packets, each of the packets of the plurality lacking a tag associating the packet with a particular network service. Since the packets lack a tag, they may be untagged packets, as described above in relation to FIGS. 3-6.

At block 704, the tools determine that at least one of the packets is a control packet. The control packet comprises a request that a device receiving the control packet make a network behavior change or network configuration change. As described above in relation to FIG. 2, the control packet may be an Ethernet BPDU or flow control packet. The control packet may also be a vendor-specific control packet such as a discovery protocol control packet.

The network behavior change requested by the control packet is an alteration of the way a network device forwards packets such as a change in the rate at which packets are transmitted or received. The network configuration change requested by the control packet may be a change in the topology of the network, such as blocking a port associated with a spanning tree.

At block 706, the tools add a tag to the control packet effective to assign the control packet to a selected network service. The tag may be the VLAN tag discussed above in relation to FIG. 3. The tag may also be an MPLS tag or other portion of a data packet that associates the control packet with the selected network service.

The selected network service may provide connectivity between a plurality of subscriber locations, as illustrated by the exemplary network configuration of FIG. 1. The selected network service may also more generally provide connectivity between a plurality of network devices that have a need to communicate with each other, regardless of their location and whether or not they are considered to be "subscriber" devices.

The tools may assign the control packet by marking the control packet with a tag, as is discussed above in relation to FIG. 5. The tools may also assign the control packet by forwarding the control packet to a virtual switch associated with the network service as is discussed above in relation to FIG. 5.

Figure 8:
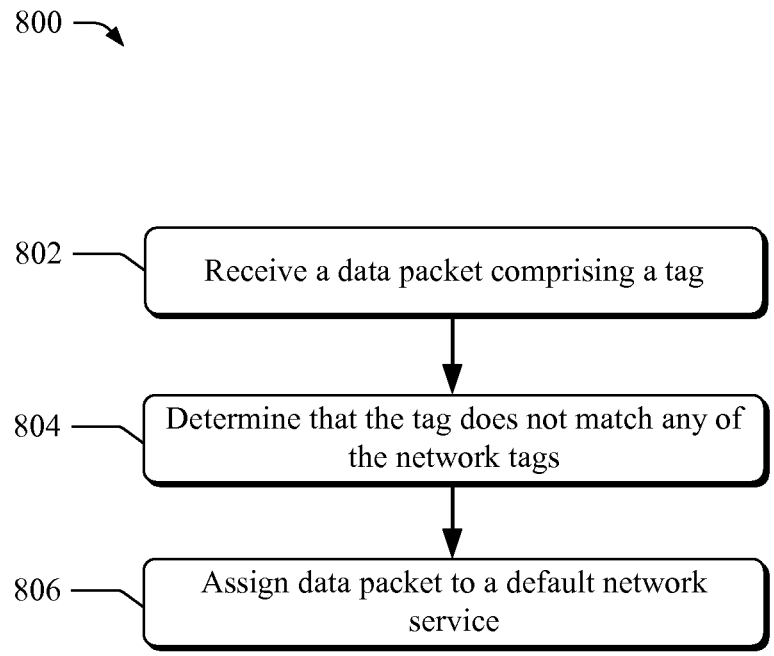
FIG. 8 is an exemplary process illustrating various embodiments and manners in which the tools assign a data packet to a default network service.

FIG. 8 illustrates another embodiment of the tools as method 800, which is illustrated as a series of blocks representing individual operations or acts performed by the tools. At block 802, the tools receive a data packet from a port of a packet switch. The data packet includes a data-packet tag capable of being used to associate the data packet with one of a plurality of network services facilitated by a network.

As was discussed above in relation to FIG. 3, the tag may be a VLAN tag. The tag may also be an MPLS tag or other portion of a data packet that associates the control packet with the selected network service.

Each network service may provide connectivity between a plurality of subscriber locations, as illustrated by the exemplary network configuration of FIG. 1. The selected network service may also more generally provide connectivity between a plurality of network devices that have a need to communicate with each other, regardless of their location and whether or not they are considered to be "subscriber" devices.

A network device, such as the switch described above in relation to FIG. 5, may use the data-packet tag to associate the data packet with one of the network services. Other network devices, such as routers, may also use the data-packet tag to associate the data packet with one of the network services.

At block 804, the tools determine that the data-packet tag does not match any of a set of network tags. The network tags are associated with the port on which the data packet is received. Each of the network tags is associated with one of the network services.

One example of a network tag is a VLAN tag. A network tag could also be an MPLS tag. The network tags associated with the port may be specified by a configuration, such as the configuration of FIG. 5. The network tags may also be specified by a network management communication, a user communication, or other communication effective to associate the network tags with the port. Although each network tag is associated with one of the network services, in some embodiments, each network service may be associated with more than one network tag.

At block 806, the tools assigning the data packet, based on the determination, to a default network service. The default network service is associated with the port and is one of the network services facilitated by the network. The default network service may be the default network service described above in relation to FIG. 6, network service "D" described above in relation to FIG. 5, or other network service associated with data packets that do not match a network tag.

The tools may assign the data packet by marking the data packet with a tag, as is discussed above in relation to FIG. 5. The tools may also assign the data packet by forwarding the data packet to a virtual switch associated with the network service as is discussed above in relation to FIG. 5. In some embodiments, the tools may assign the data packet by forwarding the data packet to a network device associated with the network service.

Figure 9:
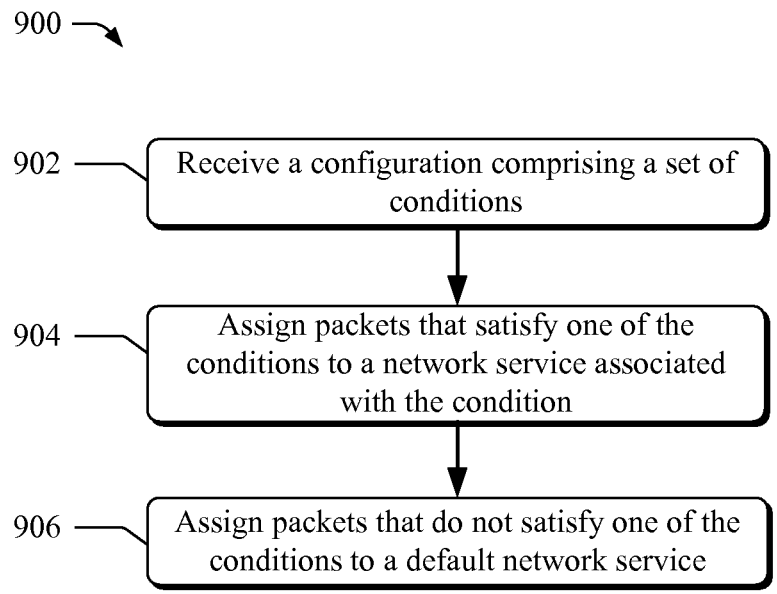
FIG. 9 is an exemplary process illustrating various embodiments and manners in which the tools assign packets to a network service based on satisfaction of a condition.

FIG. 9 illustrates another embodiment of the tools as method 900, which is illustrated as a series of blocks representing individual operations or acts performed by the tools. At block 902, the tools receive a configuration for a port of a packet switch comprising a set of conditions associated with the port. Each condition is associated with one of a plurality of network services facilitated by a network.

The configuration may be substantially similar to the exemplary configuration 550 of FIG. 5. The conditions may be simple conditions, such as the conditions illustrated by the exemplary configuration of FIG. 5. The conditions may also be more complex. For example, the conditions may be compound conditions requiring that two conditions be met, such as a condition requiring that a packet have a tag with a particular value and that the packet be a control packet.

Each network service may provide connectivity between a plurality of subscriber locations, such as the subscriber locations illustrated by the exemplary network configuration of FIG. 1. The network services may also more generally provide connectivity between a plurality of network devices that have a need to communicate with each other, regardless of their location and whether or not they are considered to be "subscriber" devices.

At block 904, the tools assign packets received at the port that satisfy one of the conditions to the network service associated with the satisfied condition. The description of the first exemplary assignment given above in relation to FIG. 5 illustrates one way that the tools may assign a packet to a network service based on the satisfaction of a condition.

At block 906, the tools assign packets received at the port that do not satisfy one of the conditions to a default network service. The default network service is associated with the port and is one of the network services facilitated by the network. The default network service may be the default network service described above in relation to FIG. 6, network service "D" described above in relation to FIG. 5, or other network service associated with data packets that do not match the network tags.

The tools may assign the packets by marking the packets with a tag, as is discussed above in relation to FIG. 5. The tools may also assign the packets by forwarding the packets to a virtual switch associated with the network service as is discussed above in relation to FIG. 5. In some embodiments, the tools may assign the packets by forwarding the packets to a network device associated with the network service.

Conclusion

The above-described tools enable data-packet switches to assign a packet to a network service. By so doing, the tools enable data-packet switches to distinguish untagged control packets received on one port of a switch from untagged control packets received on another port of the switch. The tools may also enable data-packet switches to relay tagged packets using a network service without prior knowledge of the tag values of the tagged packets. Although the tools have been described in language specific to structural features and/or methodological acts, it is to be understood that the tools defined in the appended claims are not necessarily limited to the specific features or acts described. Rather, the specific features and acts are disclosed as exemplary forms of implementing the tools.

The invention claimed is:

1. A method comprising:
a packet switch receiving a plurality of packets on a port of the packet switch;
the packet switch determining that a first one of the packets is a control packet comprising a request that a device receiving the control packet effect a network behavior change or network configuration change;
an assignment application of the packet switch determining if the first one of the packets is tagged;
if the first one of the packets is not tagged, the assignment application of the packet switch performs one of adding a first tag having a first value to the control packet effective to assign the control packet to a first network service or peering the control packet to a control plane of the packet switch;
if the first one of the packets is tagged, the assignment application of the packet switch performs one of adding the first tag having the first value to the control packet effective to assign the control packet to the first network service, assigning the control packet to a default network service associated with the port of the packet switch, or dropping the control packet;
if the first tag having the first value is added to the control packet effective to assign the control packet to the first network service, the packet switch declining to effect the network behavior change or network configuration change requested by the request and forwarding the control packet to a network node connected to the packet switch and physically distinct from the packet switch;
the packet switch determining that a second one of the packets is a non-control packet;
the packet switch adding a second tag having a second value to the non-control packet effective to assign the non-control packet to a second network service, the second value being different from the first value; and
the packet switch forwarding the non-control packet comprising the second tag to the network node.

2. The method of claim 1, wherein the tag comprises a Virtual Local Area Network (VLAN) tag conforming to the Institute of Electrical and Electronics Engineers (IEEE) 802.1 Q standard.

3. The method of claim 1, wherein assigning the control packet to the first network service further comprises forwarding the control packet to a selected virtual switch associated with the first network service, the selected virtual switch being one of a plurality of virtual switches comprising a packet switch, the selected virtual switch preventing packets assigned to the selected virtual switch from being forwarded to a packet switch port not associated with the selected virtual switch.

4. The method of claim 3, further comprising:
determining at least one of the packets is a data packet relaying data from one endpoint of a network to another endpoint of the network;
forwarding the data packet to a second selected virtual switch associated with a third network service, the second selected virtual switch being one of the plurality of virtual switches, the second selected virtual switch preventing packets assigned to the second selected virtual switch from being forwarded to a packet switch port not associated with the second selected virtual switch; and
adding a tag to the data packet effective to assign the data packet to the third network service.

5. The method of claim 3, wherein:
the selected virtual switch comprises a Virtual Local Area Network (VLAN) configured on an Ethernet switch; and
the tag is a VLAN tag associated with the VLAN.

6. The method of claim 1, wherein the first network service comprises a virtual private Local Area Network (LAN) service providing connectivity between a plurality of subscriber locations.

7. The method of claim 1, wherein the control packet comprises an Ethernet Bridge Protocol Data Unit.

8. The method of claim 1 wherein the receiving comprises receiving the control packet via a port of the packet switch and further comprising the packet switch selecting a tag value for the tag of the control packet based on the port.

9. The method of claim 1 wherein the first one of the packets conforms to a first control-packet protocol and further comprising:
the packet switch determining that a third one of the packets is a control packet comprising a request that a device receiving the control packet effect a network behavior change or network configuration change and that the third one of the packets conforms to a second control-packet protocol that is different from the first control packet protocol;
the packet switch adding a third tag having a third value different from the first and second values to the third one of the packets effective to assign the third one of the packets to a third network service;
the packet switch declining to effect the network behavior change or network configuration change requested by the request of the third one of the packets; and
the packet switch forwarding the third one of the packets to the network node.

10. The method of claim 9 wherein the first control-packet protocol is a discovery protocol and the second control-packet protocol is a spanning tree protocol.

11. A method comprising:
receiving configuration information for a port of a packet switch comprising a set of conditions associated with the port, each condition in the set being associated with one of a plurality of network services facilitated by a network, the packet switch being part of the network;
selectively assigning packets received at the port that satisfy one of the conditions to the network service associated with the satisfied condition or peering the packets received at the port that satisfy one of the conditions to a control plane of the packet switch based on the determination of an assignment application of the packet switch, wherein the determination comprises whether the packets are tagged or not tagged and peered or unpeered;

forwarding the packets that satisfy one of the conditions to one or more network nodes connected to the packet switch using the network services, wherein if the packets are tagged, the forwarding is to an associated network service, if the packets are not tagged, the forwarding is to a default network service, if the packets are peered, the forwarding is to a control plane, and if the packets are unpeered, the forwarding is either discarding the packets or assigning the packets to a network service for untagged control packets; and discarding packets received at the port that do not satisfy any of the conditions;

wherein the assigning of the packets that satisfy one of the conditions comprises adding tags associated with the network services associated with the satisfied conditions to the packets.

12. The method of claim 11, wherein assigning packets received at the port that satisfy one of the conditions further comprises assigning the packets to a selected virtual switch associated with the network service associated with the satisfied condition, the selected virtual switch being one of a plurality of virtual switches comprising the packet switch, the selected virtual switch preventing packets assigned to the selected virtual switch from being forwarded to a packet switch port not associated with the selected virtual switch.

13. The method of claim 11, wherein one of the conditions requires that a packet satisfying the condition comprise a tag having a particular value specified by the condition, the tag occupying a portion of the packet satisfying the condition.

14. The method of claim 11, wherein one of the conditions requires that a packet satisfying the condition is a control packet comprising a Virtual Local Area Network (VLAN) tag and a message requesting a change in a behavior or configuration of the network.

15. The method of claim 11, wherein:

the configuration information further comprises a set of additional conditions associated with the port, each additional condition specifying that a particular type of control packet be sent to a control plane of the packet switch;

the packets assigned to the default network service do not satisfy any of the additional conditions; and further comprising; and sending packets received at the port that satisfy one of the additional conditions to the control plane.

* * * * *